US007428916B2

(12) United States Patent
Pittau et al.

(10) Patent No.: US 7,428,916 B2
(45) Date of Patent: Sep. 30, 2008

(54) METHOD AND APPARATUS FOR MANUFACTURING ELECTRICAL HARNESSES

(75) Inventors: Serge Pittau, La Bouilladisse (FR); Christian Tourenq, Gernenos (FR)

(73) Assignee: Eurocopter, Marignane (FR)

( * ) Notice: Subject to any disclaimer, the term of this patent is extended or adjusted under 35 U.S.C. 154(b) by 260 days.

(21) Appl. No.: 11/304,716

(22) Filed: Dec. 16, 2005

(65) Prior Publication Data

US 2006/0148277 A1 Jul. 6, 2006

(30) Foreign Application Priority Data

Dec. 30, 2004 (FR) .................................. 04 14096

(51) Int. Cl.
*B23P 19/00* (2006.01)

(52) U.S. Cl. ........................ 140/92.1; 140/118; 29/755; 29/749

(58) Field of Classification Search ................. 140/118, 140/92.1, 93.6, 119–121; 29/755, 749
See application file for complete search history.

(56) References Cited

U.S. PATENT DOCUMENTS 2,768,428 A 10/1956 MacGregor et al.
3,859,724 A * 1/1975 Folkenroth ................... 29/867
4,148,130 A * 4/1979 Stauffer et al. ............. 29/566.3
4,677,734 A * 7/1987 Bloch et al. ................ 29/564.2
4,781,227 A * 11/1988 Cross ........................ 140/92.1
5,083,369 A * 1/1992 Cerda .......................... 29/857
5,205,329 A 4/1993 Suzuki et al.
5,492,155 A * 2/1996 Nishide et al. ............. 140/92.1
5,745,991 A * 5/1998 Soriano ....................... 29/863
2006/0143903 A1* 7/2006 Pittau et al. ................... 29/749
2006/0223353 A1* 10/2006 Pittau ......................... 439/164

FOREIGN PATENT DOCUMENTS

| | | | |
|---|---|---|---|
| DE | 30 06 699 | | 8/1981 |
| EP | 0 586 252 | | 3/1994 |
| JP | 06318410 | A * | 11/1994 |
| JP | 07019802 | A * | 1/1995 |
| JP | 2001143548 | A * | 5/2001 |
| JP | 2003257262 | A * | 9/2003 |
| JP | 2003257263 | A * | 9/2003 |
| JP | 2005135697 | A * | 5/2005 |
| WO | WO0182313 | | 11/2001 |

* cited by examiner

*Primary Examiner*—Dmitry Suhol
(74) *Attorney, Agent, or Firm*—Young & Thompson

(57) ABSTRACT

The present invention relates to apparatus for manufacturing a harness of segments of electrically conductive wire, the harness including a connector and the apparatus including a harness support that is elongate along an axis; the apparatus further includes a connector support (100) fitted with members (101, 102, 109) for fastening the connector to the connector support.

11 Claims, 4 Drawing Sheets

METHOD AND APPARATUS FOR MANUFACTURING ELECTRICAL HARNESSES

FIELD OF THE INVENTION

The present invention relates to a method of manufacturing electrical bundles (or harnesses), to apparatus adapted to such manufacture, and to electrical bundles or harnesses obtained thereby.

The technical field of the invention is that of manufacturing electrical harnesses for rotary wing aircraft.

BACKGROUND OF THE INVENTION

A helicopter is commonly fitted with one or more hundreds of electrical harnesses, and they can all be different from one another.

An electrical harness is usually made up of lengths of sheathed (insulated) electrically conductive wire collected together and/or tied together so as to form distinct portions, or branches, of the harness; the harness also generally comprises one (or more) electrical connectors disposed at a free end of at least one of the branches; each connector is mechanically secured to the end of at least one of the wire segments forming the branch in question; a connector includes at least one male or female electrical connection member (or terminal) which is in electrical contact with the end of one of the segments of wire, e.g. by being crimped thereto, and possibly after said end has been stripped.

Manufacturing a harness essentially consists in bringing together and/or uniting wire segment portions so as to build up the branches of the harness, and in fitting suitable connectors to the ends of the branches of the harness, where appropriate.

The manufacture of an electrical harness for a helicopter generally also includes an operation of providing the branches with electromagnetic or mechanical protection by means of a braided sheath.

Such protection makes the harness stiff, and thus makes it difficult to put the harness into place. To mitigate this drawback and to leave a degree of flexibility to the harness, it is necessary to twist the cables making it up prior to braiding on the sheath.

As a general rule, in order to manufacture a harness, use is made of a plane support, such as a bench or table, to support the electrical harness; the table may be fitted with a jig on which there appears a representation of the path to be followed by the wires or cables of the harness, as described in particular in patent application FR 2 808 374 and WO 01/82313; an operator places segments of wire on the jig in compliance with the representation, and then makes the electrical connections to the ends of the branches of the harness.

A drawback of that technique is that it requires the use of a table and a jig of shape and dimensions that match those of the harness when complete and deployed ("spread out").

In order to provide assistance in putting the wire segments into place and in keeping them on the support or jig, it is possible to fit the jig with guide pegs that serve to form bends or bifurcations in the deployed harness; it is also possible to use clamps for holding each end of a wire segment, as described in particular in U.S. Pat. No. 5,205,329.

Such devices for manufacturing electrical harnesses are complex and bulky; they are unsuitable for manufacturing helicopter electrical harnesses which can have ten or more branches, and which can extend over a length of ten or more meters.

Such devices also do not make it easy to twist the wires of the harness.

OBJECTS AND SUMMARY OF THE INVENTION

An object of the invention is to propose a method and apparatus for manufacturing electrical harnesses, which method and apparatus are improved and/or remedy at least in part the drawbacks and/or the shortcomings of known methods and apparatuses for manufacturing electrical harnesses.

In a first aspect of the invention, apparatus is proposed for manufacturing electrical harnesses, which apparatus comprises a harness support such as a bench or table that is elongate along a harness support longitudinal axis, a connector support disposed at a first longitudinal end of the harness support, and a member for fastening a connector to the connector support, and preferably a graduated rule secured to the harness support and extending parallel to the longitudinal axis of said support.

The connector support and the connector fastening member associated therewith enable a harness to be fastened to the harness support providing the harness has a branch with a connector fitted to one end thereof; thereafter the segments of wire extending from the connector can be laid out along the harness support parallel to its longitudinal axis.

In a preferred implement of a method of the invention:

- a connector fitted to an end of a first branch of the harness and comprising substantially the greatest number of wire segments in the harness (compared with the other branches of the same harness) is fastened to the connector support which has previously been secured to the table;
- thereafter, the wire segments forming said first branch are laid along the longitudinal axis of the table and they are secured together, preferably by being encircled using one or more straps (collars, adhesive tape, or "tee-rap", for example);
- a tool for holding wire segments that are to form a second branch is secured to the table and the wire segments forming part of a third branch are extended along the table in line with the first branch; for this purpose, the tool for holding wire segments in waiting is located substantially at a distance from the connector support that corresponds to the length of the first branch;
- thereafter the wire segments forming the third branch are secured to one another in the manner described above;
- the wire segments for the second branch are subsequently released from the holding tool and these wire segments are extended in line with the first branch, i.e. along the third branch and the longitudinal axis of the harness support; and
- these segments are then secured to one another to form the second branch.

When the harness has only three branches, the ends of the second and third branches can then be fitted with suitable connector(s) or terminal(s).

Thus, in an aspect of the invention, the connector fitted to the first branch is used as a reference for forming branches of predetermined lengths; the desired lengths are preferably determined with the help of the rule secured to the harness support and for which the distance origin corresponds to said connector.

Also preferably, as a distance reference (for the length of a branch) use is made of a predetermined point or face of the connector, of the connector support, and/or of a connector abutment.

To this end, a branch length reference abutment or surface is secured to the harness support and located close to the connector support, and/or integrated in the connector support.

For a "straight" connector where the predetermined point or face serving as a reference extends substantially perpendicularly to the axis along which the segments of wire secured to the connector extend, and is located at a free end of connector, the reference abutment or surface that is fitted to the harness support table extends substantially perpendicularly to the plane of the table, at its longitudinal end, against (and facing) the predetermined face of the connector as previously mounted on its support.

Otherwise, particularly for a connector that is curved or complex in shape with a free end that is differently oriented and/or having a reference point or face that is not located at the end of the connector, said abutment fitted to table may be retracted (e.g. by being pivoted) to the advantage of a second abutment which is preferably incorporated in the connector support secured to the longitudinal end of the table receiving the harness.

In another aspect of the invention, a substantially plane support is provided for preparing electrical harnesses, the support presenting a longitudinal axis, a width, a length that is preferably greater than or equal to five times the width of the support, a longitudinal slideway suitable for receiving tools or tool supports for forming and/or holding harness branch(es), and a longitudinal rule enabling the tools and tool supports to be positioned in predetermined (longitudinal) positions along the longitudinal axis of the harness support.

In another aspect of the invention, there is provided apparatus for manufacturing electrical harnesses that comprises a harness preparation support, an electrical connector holding support, a support for holding one or more wire segments in a direction extending obliquely or transversely relative to the longitudinal axis of the preparation support, and a reversal tool for reversing an electrical harness (through 180°), which holding supports and tool are arranged to co-operate with a longitudinal slideway of the harness support.

When the length of the harness to be made is longer than the harness support, then a (first) harness guide (or reversing tool) is located at the second end of the harness support so as to enable the harness to be curved through about 180°.

Thereafter, the harness can continue to be prepared in the same manner as described above by laying out the portion of the harness that remains to be prepared along a second longitudinal axis that is parallel to the longitudinal axis of the harness support and that lies at a short distance (e.g. few centimeters) away from said harness support axis.

When the length of the harness is more than twice the length of the harness support, then a second harness guide member identical or similar to said first harness guide member is secured to the first end of the harness support in the vicinity of said connector support.

In a preferred embodiment of the invention, the apparatus for manufacturing electrical harnesses includes a tool for twisting (standing) the electrically-conductive wire segments in substantially regular manner.

Twisting imparts increased flexibility (or capacity for deformation) to the harness, thereby reducing the mechanical stresses that are imposed on the wire segments when they are bent or curved; each twisted wire segment takes up a spiral shape substantially without being twisted about its own longitudinal axis.

It is possible to twist the wire segments forming a branch with the help of a twisting tool, with said tool being moved along the harness support while being caused to rotate, and while using the rule to control the length of the twisted portion extending from the connector secured to the harness support.

When a predetermined length of harness corresponding to the length of the branch having the connector fitted thereto (referred to as the first branch) has been twisted in this way, then the wire segments that are to form a second branch are separated from the wire segments that are to form a third branch; the wire segments that are to form the second branch are secured temporarily to the harness support; the wire segments that are to form the third branch are laid out in line with the first branch and the wires of the third branch are twisted; thereafter, and where appropriate, a connector is secured at least to the end of said third branch and the same procedure is then repeated for the second branch, after separating the wire segments of said branch from the harness support.

Thus, the various branches of the twisted harness are prepared substantially along a single axis, i.e. substantially along the longitudinal axis of the harness support which is preferably horizontal and which presents an aspect ratio (ratio of its length divided by its width) that is large, e.g. of the order of about 10 to 15.

Each branch of the electrical harness is preferably twisted in succession; for this purpose, it is preferable to use a twisting tool having (at least) two cavities, each cavity being associated with retaining means enabling at least a portion of a wire segment to be retained in the cavity, and with release means enabling said portion of wire segment to be extracted from the cavity, and with opening means enabling said portion of wire segment to be inserted into the cavity.

The twisting tool preferably also includes a body that is substantially a body of revolution about an axis (of symmetry), in particular a body that presents the general shape of a sphere, a cylinder, or a disk; the body of the tool presents slots or notches forming said cavities that extend substantially parallel to the axis of symmetry of the body, and each of which opens out into the outside surface of the body via a peripheral opening, the body thus somewhat resembling the cylinder of a revolver.

The notches or slots are preferably substantially regularly distributed around the periphery of the body.

The body preferably presents at least four cavities or slots, and in particular at least eight cavities or slots, that are substantially identical in shape and dimensions, and (each) suitable for receiving a plurality of wire segments.

The wires engaged in and distributed amongst the slots of the tool and each having one end (temporarily) secured to a support forming part of the apparatus of the invention, are twisted by turning the tool about its own axis of symmetry, where this turning operation can be performed manually by an operator.

In order to enable the operator to estimate or measure the angle through which the tool rotates and/or the number of turns made by the tool, it preferably includes a visible rotation marker disposed close to the periphery of the tool body.

In a preferred embodiment, the retaining, release, and opening means of the twisting tool comprise a ring mounted to pivot around the body of the tool about said axis of symmetry; the ring is interrupted (open) over a portion corresponding substantially to the size of the peripheral opening of one of the slots; the ring is mounted on the body so as to close the openings of the slots in the tool with the exception of no more than one slot having its peripheral opening in register with the interrupted portion or gap of the ring; under such circumstances, the fraction of the periphery of the body associated with each slot preferably presents a dimension (arc length in the outside surface of the tool body) that is greater than or equal to the arc length of the interruption or gap provided in the ring; thus, regardless of the angular position of the ring relative to the tool body, no more than one slot can be open at a time; in particular, the length of the interruption in each ring is substantially equal to the arc length along which each slot opening extends.

Also preferably, the tool has two such rings for selectively opening one of the slots, which rings are mounted to pivot coaxially relative to the tool body, with the pivoting of a first one of the two rings being independent of the pivoting of a second one of the two rings.

This makes it possible to place the two respective interruptions of the two rings successively one and then the other in register with the peripheral opening of a predetermined slot in order to release the wire segments extending through said slot; because of the presence of two independent interrupted rings, moving the interruption in only one of the two pivoting rings into register with the opening in a slot does not allow the wire segments engaged therein to be released; this makes it possible to avoid a set of wire segments being released accidentally when the interruption in only one of the two rings passes in register with the opening of the slot receiving said batch of wire segments.

Preferably, the apparatus of the invention includes a plurality of slideways extending parallel to the longitudinal axis of the harness support, and a sliding support for the harness wire twisting tool.

The twisting tool support can thus slide along the axis of the harness support; the apparatus preferably further includes locking means for holding each tool or tool support (such as the twisting tool support) in position at any point along any of the slideways.

The twisting tool support presents a configuration that is adapted to receive and hold in place the twisting tool; in particular, the tool support may present a cradle or arch-shaped portion of shape complementary to the outside shape of the tool.

BRIEF DESCRIPTION OF THE DRAWINGS

Other characteristics and advantages of the invention appear in the following description which refers to the accompanying drawings which show preferred embodiments of the invention without any limiting character. Unless indicated to the contrary, identical references designate elements that are identical or similar in structure and/or function.

FIG. 3 corresponds to a harness fitted with a connector having a plane end face that serves as a length reference; FIG. 4 corresponds to a harness fitted with a curved connector having an intermediate plane face that serves as a length reference (for ensuring that the branches have the right length).

MORE DETAILED DESCRIPTION

Figure 7:
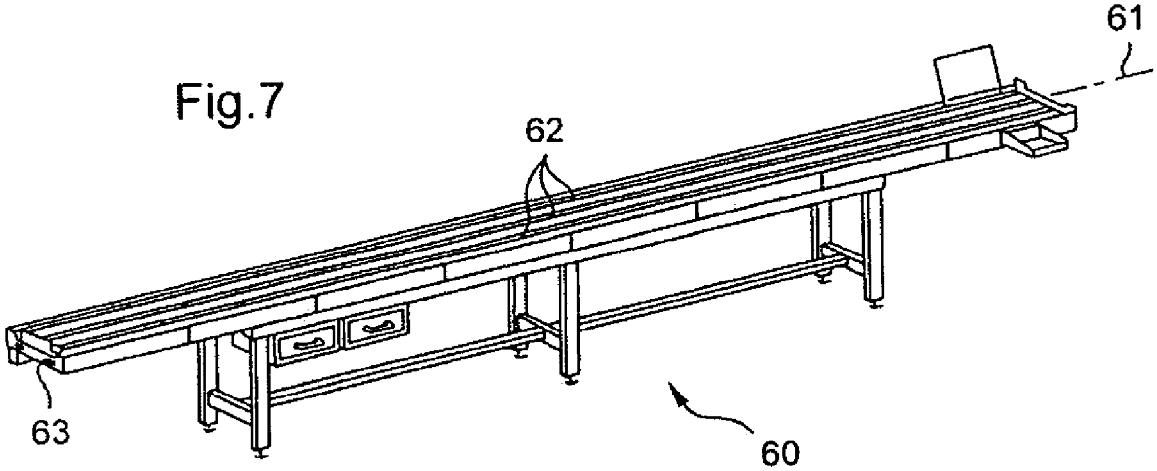
FIG. 7 is a diagrammatic perspective view of a harness support of apparatus of the invention.

With reference to FIG. 7, the apparatus for manufacturing harnesses comprises a table 60 extending substantially horizontally and presenting a longitudinal axis 61.

The table has three parallel longitudinal slideways 62 extending substantially along its entire length.

Each of these slideways enables tools to be secured to the table at predetermined positions (as measured along the axis 61), and enables the tools to slide along said axis.

Figure 1:
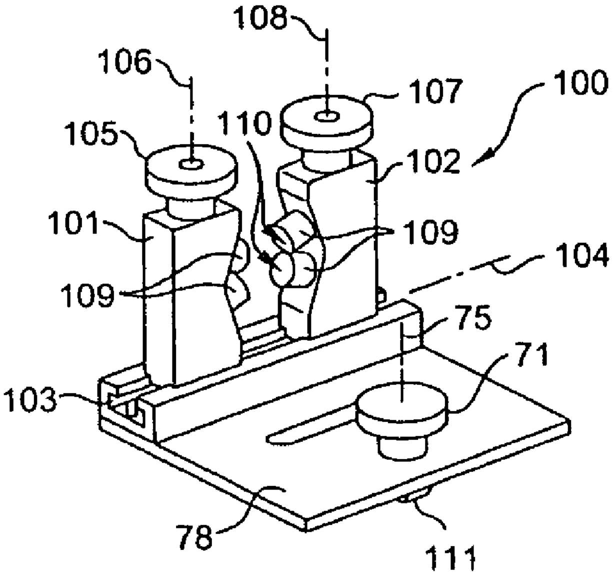
FIG. 1 is a diagrammatic perspective view of a connector support of apparatus of the invention.
Figure 6:
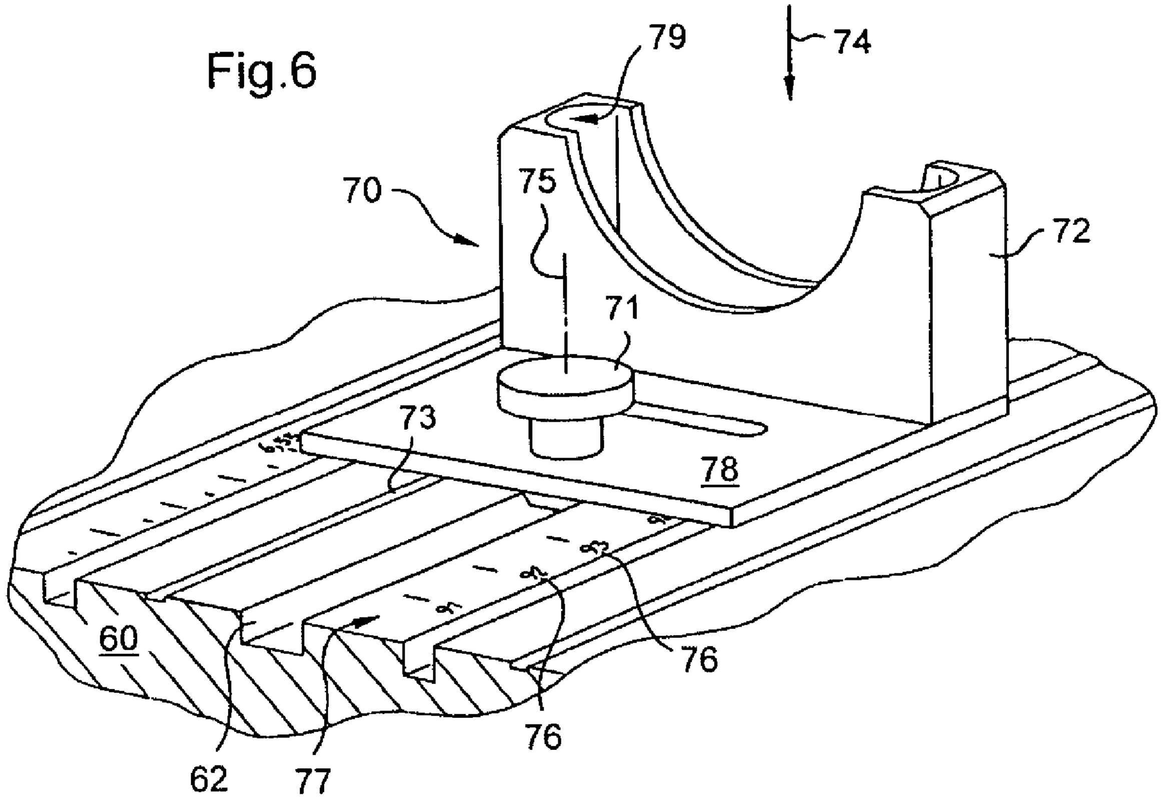
FIG. 6 is a diagrammatic perspective view of a twisting tool support placed on a harness support in accordance with an aspect of the invention.
Figure 9:
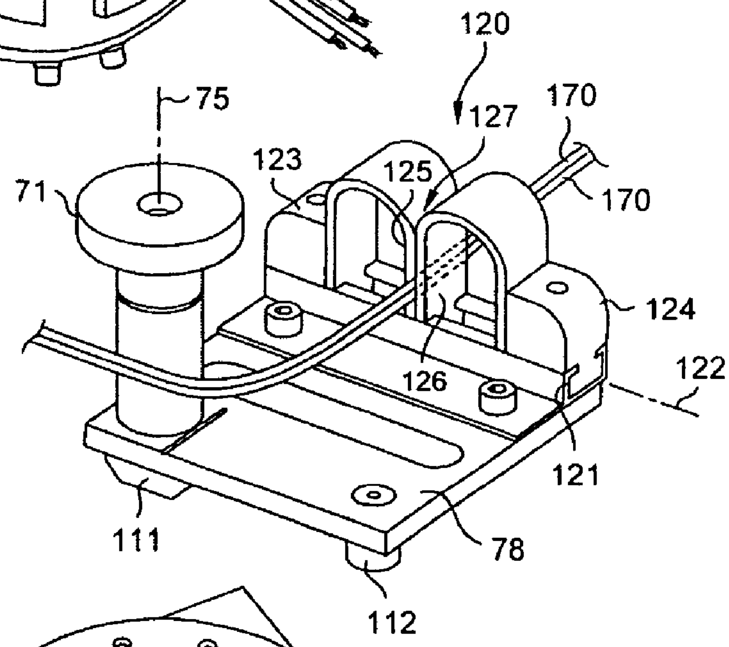
FIGS. 9 and 10 are diagrammatic perspective views respectively of a wire-holding tool and of a branch-reversing tool of apparatus of the invention.
Figure 10:
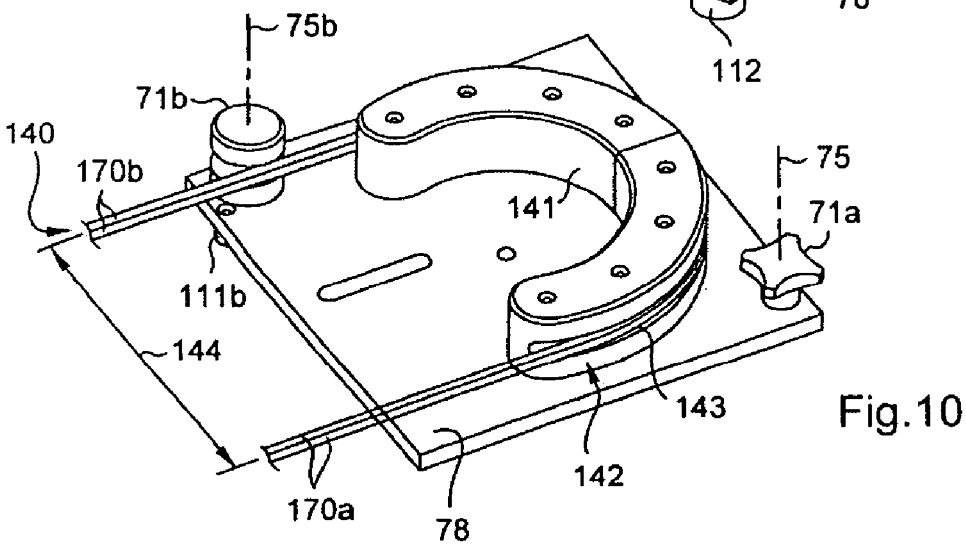

These tools consist essentially in a connector support 100 as shown in FIG. 1, a support 70 for a twisting tool as shown in FIG. 6, a tool 120 for holding wires in waiting, as shown in FIG. 9, and a tool 140 for reversing the harness, as shown in FIG. 10.

Figure 5:
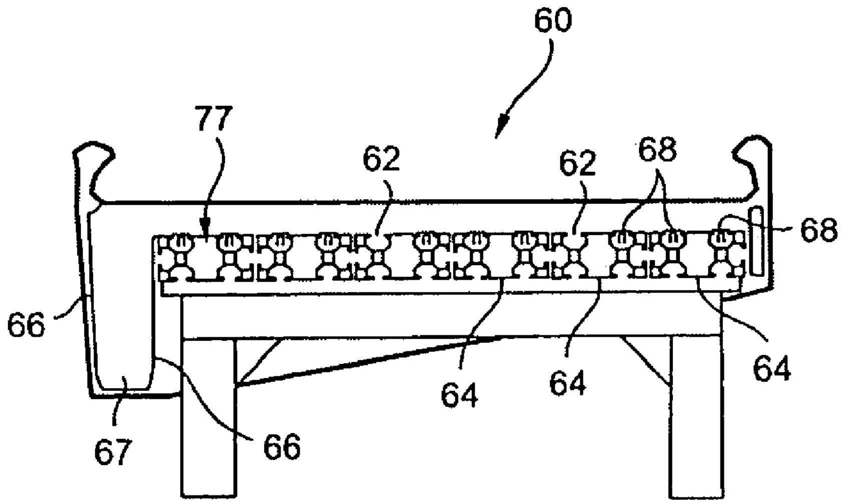
FIG. 5 is a diagrammatic cross-section view of a harness support of the invention.

With reference to FIG. 5, the top of the table 60 carries six identical metal section members 64 that are placed side by side and assembled together, the section members extending perpendicularly to the plane of FIG. 5, parallel to the longitudinal axis of the table.

The top portion of each of these section members presents two longitudinal grooves 62; closure section members 68 are engaged in some of the grooves so as to close them, with the exception of the grooves that are used for fixing a tool on the top face 77 of the table (two of the grooves 62 in FIG. 5).

Along one of the two longitudinal edges of the table there extends a gutter or chute 67 defined by walls 66 extending below the work surface of the table in order to receive ramifications of a harness that is being prepared.

Figure 2:
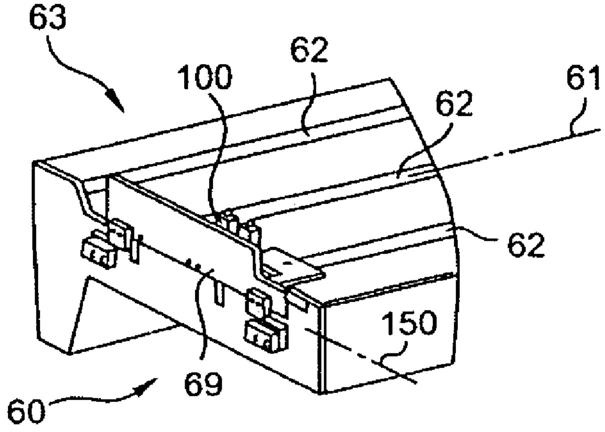
FIG. 2 is a diagrammatic perspective view on a larger scale of a longitudinal end of a harness support of the invention and as shown in FIG. 7.

With reference to FIG. 2, at one longitudinal end 63 of the table 60 there is provided a connector support 100 matching a connector that is fitted to the harness being manufactured.

With reference to FIG. 6, the support 70 for a twisting tool comprises a baseplate 78 having a bottom face resting on the table 60.

A screw on axis 75 presents a knurled head 71 and extends through an orifice pierced in the baseplate; the other end of the screw (not shown in FIG. 6) has a connection member of shape adapted to the cross-section of the slideway-forming hollow groove 62 so as to enable the support 70 for a twisting tool to be secured temporarily (reversibly) at a determined position along the table.

For this purpose, a plurality of graduations 76 are formed on the top face 77 of the table 60 to constitute a rule 65.

The twisting tool support 70 also comprises a cradle 72 for receiving—along arrow 74—a twisting tool in which wire segments of a harness for twisting have been engaged; the cradle is secured to the baseplate 78 and is in the form of a half-collar with a groove 79 of profile matching the profile of the tool 20 that is to be received in the groove of the cradle.

The connector support tool 100, the tool 120 for holding wires of a branch that is waiting to be processed, and the reversing tool 140, all have baseplates identical or similar to that of the twisting tool support 70; each comprises a baseplate 78 for standing on the work surface 77 of the table, and a screw passing through the baseplate for co-operating with a nut (such as 111 shown in FIG. 9) extending beneath the baseplate and of a shape that is complementary in section to the shape of the profile of each groove 62 in the table; this enables the nut to be engaged in a groove 62 and then by tightening the screw 71, 71*a,* this enables the tool to be secured to the table via its baseplate 78.

With reference to FIG. 1, the tool 100 comprises two jaws 101, 102 passing respective screws on axes 106, 108, each presenting a knurled head 105, 107 and co-operating with a nut (not shown in FIG. 1) engaged in a slideway 103 secured to the baseplate 78.

The nut enables the corresponding jaw to be held in a determined position along the axis 104 of the slideway 103.

The two jaws present respective V-shaped faces that face each other; two deformable pads 109 that slope relative to each other project from the V-shaped faces of each jaw; the spacing between the jaws along the axis 104 can thus be adjusted so as to clamp a connector (160 in FIGS. 3 and 4) between the bearing faces 110 of the pads 109 fitted to the jaws.

Figure 3:
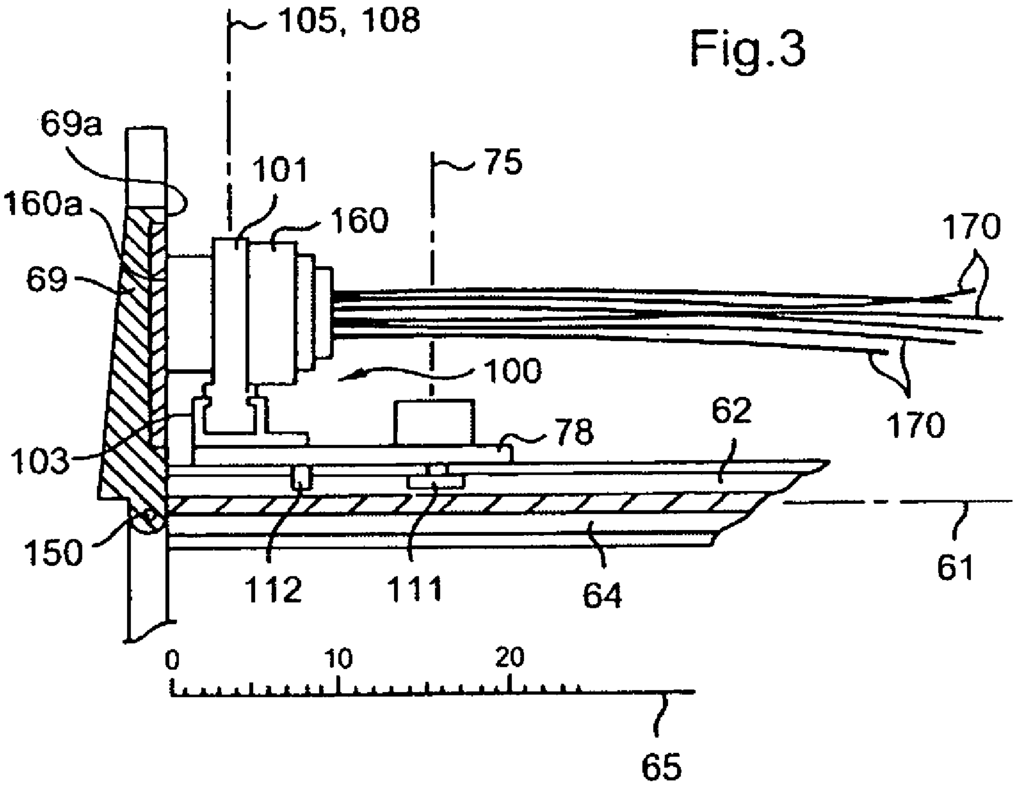
FIGS. 3 and 4 are side views showing a connector being fixed to a harness at the end of the support table shown in FIGS. 2 and 7, by using the removable connector-fastening tool shown in FIG. 1.
Figure 4:
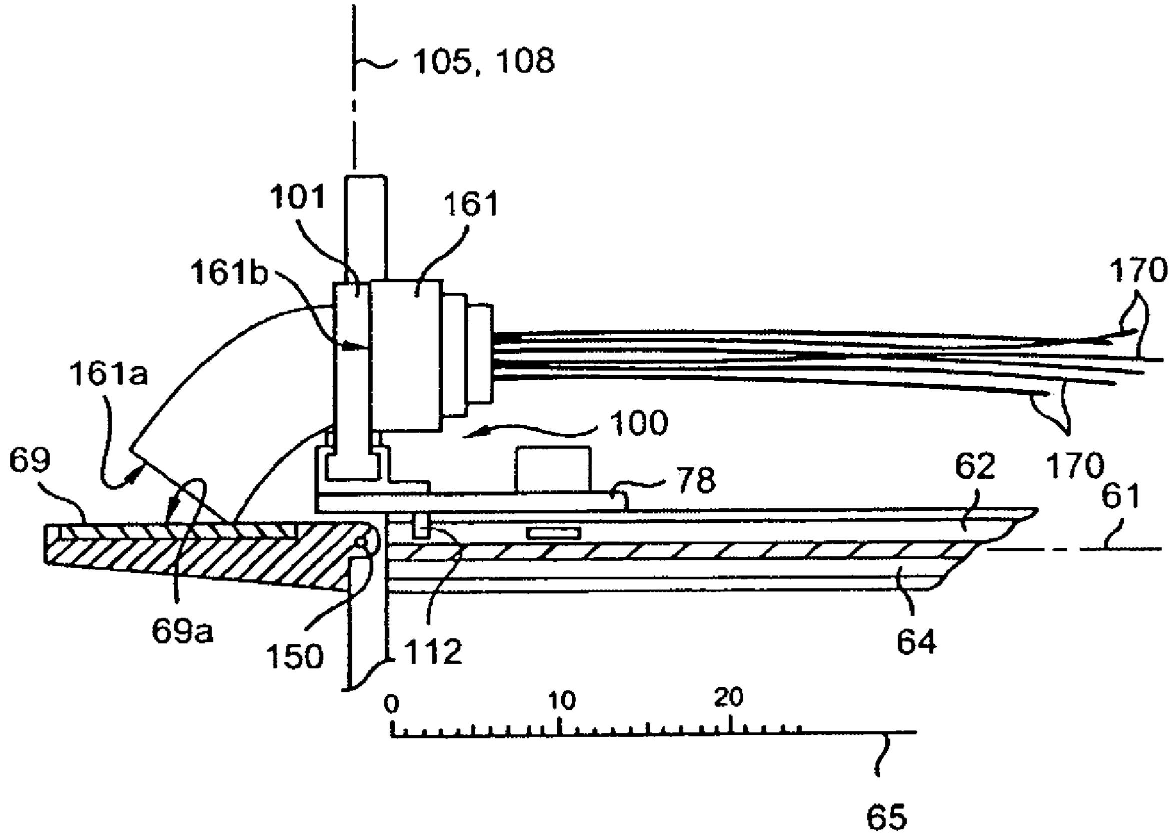

With reference to FIGS. 2 to 4, the tool 100 is engaged by the nut 111 fitted to the screw 71 and also by a peg 112 projecting under the baseplate 78 in a groove 62 of a section member 64 of the table.

A connector 160, 161 is clamped between the jaws (such as 101) of the tool 100, and is thus secured to the table by means of said tool.

In the configuration shown in FIG. 3, where the connector 160 presents a plane end face 160*a* perpendicular to the longitudinal axis 61 of the table and of the grooves, the face 160*a* is pressed against a retractable abutment 69 presenting a plane reference face 69*a* that corresponds to the origin ("0") of the graduations of the rule 65 fitted to the table, as shown diagrammatically in FIGS. 3 and 4.

The abutment 69 can pivot about the axis 150 orthogonal to the axis 61 and to the plane of FIGS. 3 and 4 so as to pass from a vertical position (FIG. 3) where the face 69*a* acts as a reference, to a retracted position (FIG. 4); in this position of the abutment 69, the reference for measuring lengths can be given by a face of the jaws 101, 102 of the tool 100 against which there bears a face 161*b* of the connector 161 whose end 161a is at an angle and/or curved.

Figure 8:
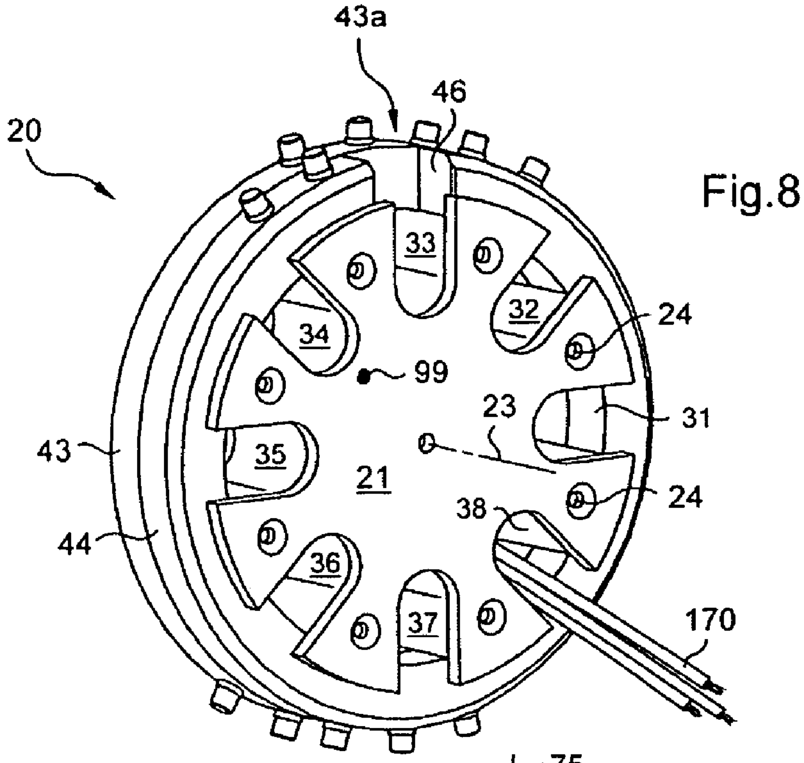
FIG. 8 is a diagrammatic perspective view of a twisting tool of apparatus of the invention.

With reference to FIG. 8 in particular, the twisting tool 20 comprises a body 21 generally in the form of a thick disk presenting an axis of symmetry 23, and having formed therein a peripheral groove together with eight peripheral slots 31 to 38 that are identical in shape and regularly spaced apart (about the axis of symmetry 23).

Each of these slots opens out into the periphery of the body, in particular into said groove, via a respective peripheral opening.

The tool also comprises two substantially identical rings 43 and 44 that are received in part in the groove, each presenting a portion that projects relative to the endplates of the body, and each being capable of sliding in rotation around the body 21 about the axis 23.

Each of these rings presents a interruption or gap 46 of "width" or arc length that exceeds the "width" or arc length of the opening of a slot; the length of the interruption 46 nevertheless remains less than the length of the arc corresponding to that fraction of the body that is associated with each slot (in this case one-eighth); this makes it easier to insert one or more segments of wire into the slot (such as 31) placed in register with the interruption in each of the rings in a "peripheral" direction, and also makes it easier to extract the wires that extend through said slot, in the same configuration for releasing the segments extending through said slot, by passing through the peripheral opening of the slot, and also through the gap provided by the two adjacent rings.

With reference to FIG. 8, a visible sign 99 such as a colored spot, a digit, or a letter serves to identify the angular position of the tool 20 about the axis 23.

In addition, independently turning the two rings 43, 44 enables the tool to be put into the configuration shown in FIG. 8 where a portion 43*a* of the ring 43 overlaps the interruption 46 in the ring 44; in this configuration, the two rings can be turned simultaneously about the axis 23 around the body of the tool through any amplitude without there being any risk of any of the wire segments 170 passing through any of the slots being able to escape therefrom.

With reference to FIG. 9, the tool 120 for holding the wire segments of a branch waiting for processing presents a baseplate 78 receiving a guide peg 112, a screw, and a holding nut 111, together with a slideway 121 of axis 122 parallel to the plane of the baseplate; when the peg and the nut are engaged in a slideway of the harness support table, the axis 122 is parallel to the axis of the slideway.

The slideway 121 receives two blocks 123 and 124 that are respectively secured to two blades 125, 126 that are curved to from upside-down U shapes; these blades serve to clamp onto a packet of wires; for this purpose, the spacing between the blocks along the axis 122 of the slideway 121 is adjustable by a screw-and-nut system (not shown) similar to the system 71, 111.

Each of the blades 125, 126 is elastically deformable so that the wire segments 170 at a bifurcation can be forced into the gap 127 between the blades and can be held clamped between them until they are extracted from said gap 127.

Meanwhile, the fraction of the wires segments waiting to be processed extend beyond the edge of the table and is received in the receiver gutter 67.

With reference to FIG. 10, the tool 140 for curving the branch(es) being processed comprises a baseplate 78 fitted with a first screw 71*a* for securing in a first slideway of the table, and with a second screw 71*b* for fastening the tool 140 in a second slideway of the table (by means of a second nut 111*b* identical or similar to the above-mentioned nut 111).

The baseplate is secured to an arch 141 of substantially semicircular shape, having an outer side face 142 that presents a groove 143.

When the tool 140 is secured to the end of the table that is remote from the end 63 receiving the connector support 100 (see FIG. 7), the baseplate of the tool is secured in such a manner that the two ends of the groove 143 extend substantially parallel to two slideways of the table, and are spaced apart by a distance 144 corresponding to the spacing between the slideways of the table; the groove presents a predetermined groove length such that a second rule parallel to the first can be used for measuring the length of the portion 170*b* of the wire segments extending downstream from the tool 140; the groove of the arch serves to hold the portion of the wire segments that are received in said groove and enables the branch(es) constituted by said segments to be temporarily curved through an angle of about 180°, thus enabling a harness to be manufactured that is nearly twice as long as the table.

In a preferred implementation of the invention, manufacturing a harness comprises the following successive operations:

a) inserting all of the wires 170 constituting the harness in a main connector 160, 161, the wires being segregated into packets corresponding to respective branches of the harness;

b) engaging the main connector 160, 161 in its support 100 locked in a first groove 62 at the end 63 of the table 60;

c) positioning branch-holding tools 120 in the groove 62 at predetermined locations corresponding to the bifurcations of the harness that is being processed, these locations possibly being stored in a database and being displayed to the operator;

d) engaging the wires in the slots of the twisting tool 20, there being one packet of wires per slot; if there are few branches, it is also possible to share the wire segments of a single branch of the harness amongst a plurality of slots, for example amongst two diametrically-opposite slots;

e) to twist one branch:

e1) turning the twisting tool 20 about its own axis (which axis 23 is disposed substantially parallel to the axis 61) through about three revolutions while advancing the tool along the axis 61 over about one meter;

e2) placing the tool 20 on its support 70;

e3) manually separating (combing) the set of wires of the portion of harness that has not yet passed through the tool 20 so as to avoid forming any "knots";

e4) positioning at least one strap (collar, adhesive tape, or "tee-rap", for example) on the twisted portion of the harness that has passed through the tool 20; and e5) repeating steps e1) to e4) until the operator reaches a bifurcation;

f) for each bifurcation of the harness:

f1) removing from the twisting tool 20 the packet of wire segments corresponding to the branch that is to be processed subsequently (bifurcation);

f2) locking the waiting packet of wires that has been released in this way by means of a cable clamp 125, 126 fitted to the corresponding holding tool 120 that was pre-positioned in step c); and f3) repeating step e) until the operator reaches the free end of a branch (a packet);

g) processing the ends of the branches:

g1) disengaging the free end of the packet from the tool 20;

g2) cutting the wires to defined length by measuring along the rule (reference on the main connector 160, 161) as a function of branch length information made available to the operator; and g3) optionally inserting the wires in an end connector; in order to release the harness-building table, the operator might alternatively assemble the connectors at another workstation, after twisting all of the branches of the harness; and h) so long as there remains a branch that has not been twisted, the operator extracts the packet of wires constituting the branch for twisting from the tool 120 for holding wires in waiting, disengages the already-twisted portion from the groove 62 so as to align the branch that is to be twisted along the groove and the rule, and then repeats the procedure from above step c).

Naturally, various additions, omissions, or modifications could be applied by the person skilled in the art to the various embodiments described above, both concerning their structural elements and their functional components, without thereby going beyond the ambit of the present invention.

What is claimed is:

1. Apparatus for manufacturing a harness of electrically conductive wire segments including a connector, the apparatus comprising:

a harness support being elongate along a longitudinal axis and including a longitudinal slideway;

a connector support fitted with members for fastening the connector to the connector support;

a tool for reversing a direction that the wire segments extend;

means for fastening the connector support to a first longitudinal end of the harness support; and means for fastening the reversing tool to a second longitudinal end of the harness support.

2. Apparatus according to claim 1, further comprising a graduated rule secured to the harness support and extending parallel to the longitudinal axis.

3. Apparatus according to claim 1, further comprising an abutment serving as a reference for measuring a length of branches of the harness.

4. Apparatus according to claim 3, wherein the abutment is retractable.

5. Apparatus according to claim 1, further comprising a tool for holding wire segments in a direction that extends transversely or obliquely relative to the longitudinal axis of the harness support.

6. Apparatus according to claim 5, wherein the holding tool comprises elastically-deformable blades arranged to clamp onto ones of the wire segments that are to be held in waiting.

7. Apparatus according to claim 1, further comprising a gutter extending along a longitudinal edge of the harness support and arranged to receive portions of wire segments extending beyond the harness support.

8. Apparatus according to claim 1, wherein each of the connector support and the reversing tool comprises a guide member and a locking member designed to engage with the slideway.

9. Apparatus according to claim 1, wherein the harness support includes at least two longitudinal slideways, and wherein a length of the harness support is greater than or equal to five times its width.

10. A method of manufacturing an electrical harness including a connector using the apparatus according to claim 1, said method comprising:

inserting the wire segments of the harness into the connector;

engaging the connector in the connector support;

fastening the connector support to the first longitudinal end of the harness support; and fastening the reversing tool to the second longitudinal end of the harness support.

11. Apparatus for manufacturing a harness of electrically conductive wire segments including a connector, the apparatus comprising:

a harness support that is elongate along a longitudinal axis and including a longitudinal slideway;

a connector support fitted with members for fastening the connector to the connector support;

a harness twisting tool; and a twisting tool support slidably mounted on the harness support via the slideway of the harness support.

* * * * *